US006455196B1

United States Patent
Kato et al.

(10) Patent No.: US 6,455,196 B1
(45) Date of Patent: Sep. 24, 2002

(54) NON-SINTERED POSITIVE ELECTRODE FOR ALKALINE STORAGE BATTERY AND ALKALINE STORAGE BATTERY USING THE SAME

(75) Inventors: Fumio Kato; Tatsuhiko Suzuki, both of Kamakura; Futoshi Tanigawa; Yoshitaka Dansui, both of Fujisawa; Kohji Yuasa, Chigasaki, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/209,468

(22) Filed: Dec. 11, 1998

(30) Foreign Application Priority Data

Dec. 26, 1997 (JP) .............................. 9-360857
Sep. 11, 1998 (JP) .......................... 10-276636

(51) Int. Cl.⁷ ................................................ H01M 4/52
(52) U.S. Cl. ...................... 429/223; 429/232; 429/236
(58) Field of Search ................. 429/223, 232, 429/236

(56) References Cited

U.S. PATENT DOCUMENTS

| | | | | |
|---|---|---|---|---|
| 4,844,999 A | * | 7/1989 | Oshitani ...................... | 429/223 |
| 5,244,758 A | | 9/1993 | Bronoel et al. | |
| 5,405,714 A | | 4/1995 | Terasaka et al. | |
| 5,489,314 A | * | 2/1996 | Bogauchi .................... | 29/623.5 |
| 5,523,182 A | * | 6/1996 | Ovshinsky .................. | 429/223 |
| 5,965,295 A | * | 10/1999 | Bando ......................... | 429/223 |
| 6,007,946 A | * | 12/1999 | Yano ........................... | 429/223 |
| 6,033,805 A | * | 3/2000 | Dansui ........................ | 429/223 |

FOREIGN PATENT DOCUMENTS

| | | |
|---|---|---|
| EP | 0609180 | 8/1994 |
| EP | 0727835 | 8/1996 |
| EP | 0851516 | 7/1998 |
| FR | 2677812 | 12/1992 |
| JP | 5036935 | 8/1973 |
| JP | 62-136761 | 6/1987 |
| JP | 9147905 | 6/1997 |
| JP | 9259888 | 10/1997 |

OTHER PUBLICATIONS

Partial English translation of JP 50–36935, Aug. 1973.

* cited by examiner

Primary Examiner—Maria Nuzzolillo
Assistant Examiner—Mark Ruthkosky
(74) Attorney, Agent, or Firm—Stevens, Davis, Miller & Mosher, LLP

(57) ABSTRACT

The present invention provides alkaline storage batteries high in energy density and excellent in overdischarge resistance, and, besides, less in decrease of capacity even if charging and discharging cycle is repeated at high temperatures. There is used a positive electrode comprising a foamed nickel substrate having the number of pores of 80–160 pores/inch ($PPI_{2D}$) and a thickness of skeleton of 30–60 $\mu$m in which spherical nickel hydroxide solid solution particles having an average particle size of 5–20 $\mu$m and a cobalt oxide conductive agent having an average particle size of 1 $\mu$m or less and mainly composed of $\gamma$-cobalt oxyhydroxide having a cobalt valence of higher than 3.0 are held and the total occupying ratio of the spherical nickel hydroxide solid solution particles and the cobalt oxide conductive agent based on the whole electrode plate is in the range of 75–85 vol %.

8 Claims, 6 Drawing Sheets

500 $\mu$m

500 μm

500 μm

FIG.2
LENGTH OF ONE SIDE OF TRIPLE POINT ≡
THICKNESS OF SUBSTRATE SKELETON
ONE TRIPLE POINT   TWO BONDED TRIPLE POINTS   TWO BONDED TRIPLE POINTS
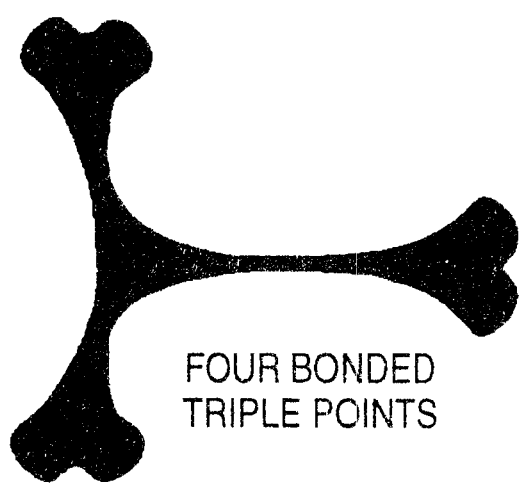
FOUR BONDED TRIPLE POINTS
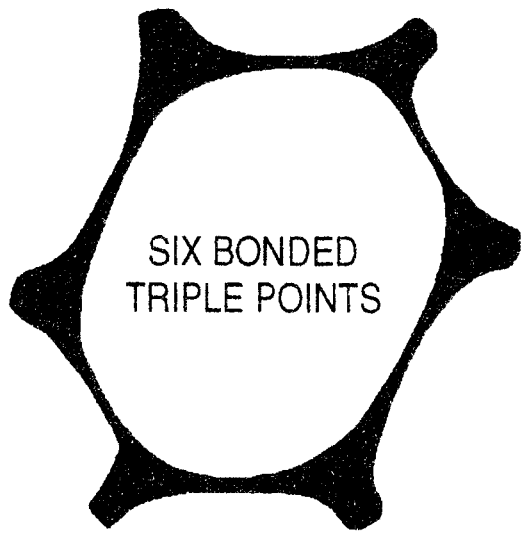
SIX BONDED TRIPLE POINTS

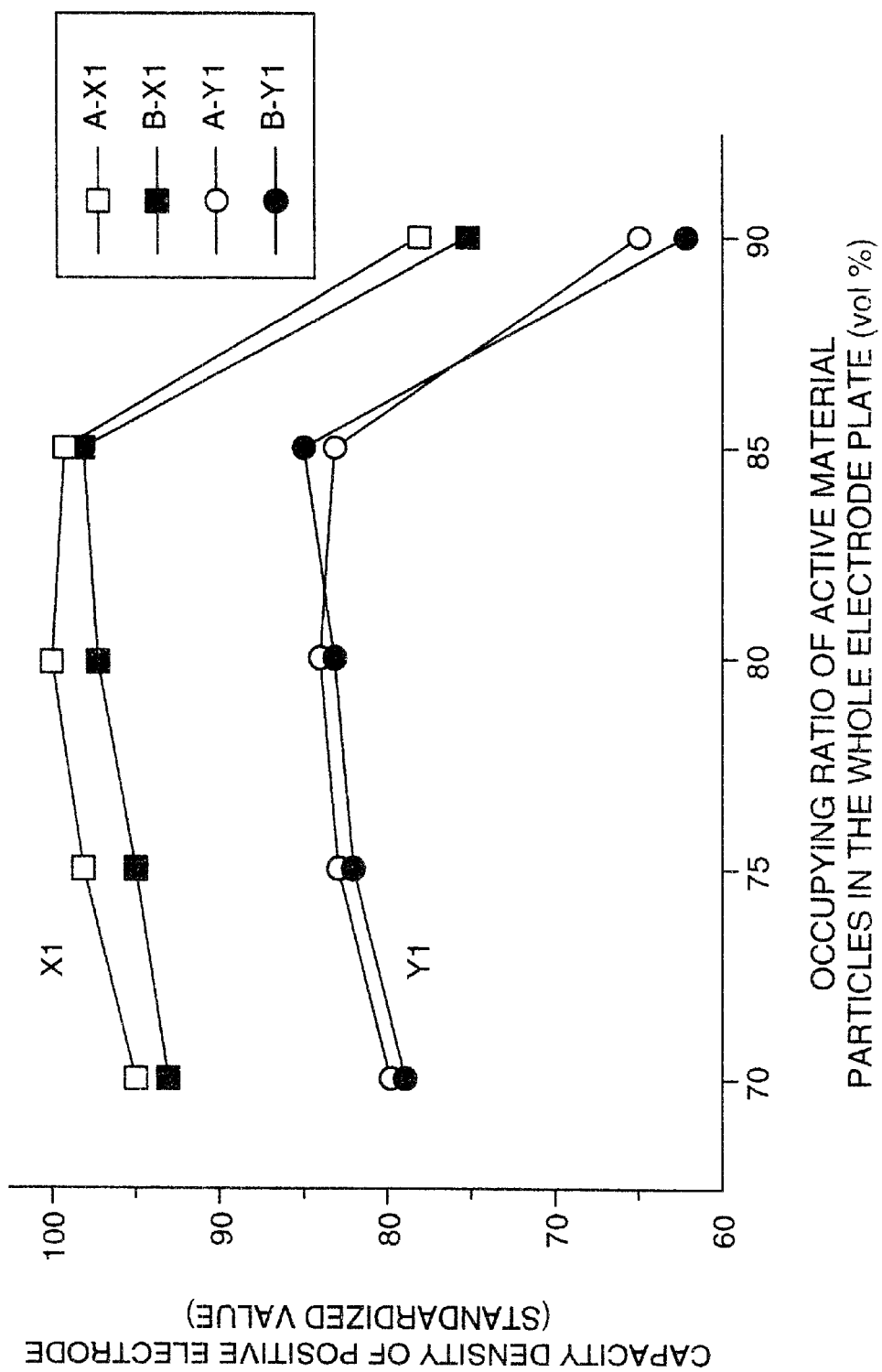

NON-SINTERED POSITIVE ELECTRODE FOR ALKALINE STORAGE BATTERY AND ALKALINE STORAGE BATTERY USING THE SAME

BACKGROUND OF THE INVENTION

1. Field of the Invention

The present invention relates to a non-sintered positive electrode for alkaline storage batteries and an alkaline storage battery using the same.

2. Description of Related Art

Recently, with the spread of portable apparatuses, alkaline storage batteries are strongly demanded to be high in capacity. Particularly, nickel-metal hydride storage batteries are secondary batteries comprising positive electrodes mainly composed of nickel hydroxide and negative electrodes mainly composed of a hydrogen-storing alloy, and these batteries have rapidly spread as secondary batteries of high capacity and reliability.

The positive electrodes for alkaline storage batteries will be explained.

The positive electrodes for alkaline storage batteries are roughly classified into sintered type and non-sintered type. The former are made by impregnating a nickel sintered substrate of about 80% in porosity obtained by sintering a core material such as punching metal and a nickel powder with a nickel salt solution such as an aqueous nickel nitrate solution and subsequently with an aqueous alkaline solution, thereby to produce nickel hydroxide in the porous nickel sintered substrate. In these positive electrodes, the porosity of the substrate is difficult to further increase, and amount of nickel hydroxide cannot be increased. Thus, there is a limit in enhancement of capacity.

As the latter non-sintered type positive electrodes, JP-A-50-36935 proposes those which comprise a foamed nickel substrate of about 95% in porosity comprising three-dimensionally communicating pores in which nickel hydroxide particles are held and which are being widely used as positive electrodes for alkaline storage batteries of high capacity. In these non-sintered positive electrodes, spherical nickel hydroxide particles having a high bulk density are used from the point of increase in capacity. As disclosed in JP-A-62-136761, particle size of the nickel hydroxide particles and size of the pores of the foamed nickel substrate are adjusted to proper values. Moreover, metallic ions such as cobalt, cadmium and zinc are usually dissolved in the nickel hydroxide particles in the state of solid solution for the improvement of discharge characteristics, charge acceptance and life characteristics.

Here, since the size of the pores of the foamed nickel substrate is set sufficiently larger than the particle size of nickel hydroxide, the charge and discharge reaction smoothly proceeds in the nickel hydroxide particles present near the substrate skeleton which maintains current collection, but the reaction does not sufficiently proceed in the nickel hydroxide particles apart from the skeleton. Therefore, in non-sintered positive electrodes, the nickel hydroxide particles are electrically connected to each other using a conductive agent to improve utilization ratio of the packed nickel hydroxide particles. In many cases, divalent cobalt oxides such as cobalt hydroxide and cobalt monoxide are used as the conductive agent. These divalent cobalt oxides per se have no electrical conductivity, but are electrochemically oxidized to β-cobalt oxyhydroxide having conductivity in the initial charging in the battery, which functions as an electrically conductive network. Thanks to the presence of the conductive network, the utilization ratio of active material packed at high density can be greatly increased in the non-sintered positive electrodes and thus increase of capacity can be attained as compared with in the sintered positive electrodes.

However, even the non-sintered positive electrodes having the above construction are not complete in current collecting performance of the conductive network and have their upper limits in utilization ratio of nickel hydroxide particles. Furthermore, the above positive electrodes suffer from the problems that when the battery is overcharged or kept with being short-circuited or stored for a long period or at high temperatures, the capacity of the positive electrodes lowers by the subsequent charging and discharging. This is because the electrochemical oxidation reaction in the battery as mentioned above cannot completely change a bivalent cobalt oxide to β-cobalt oxyhydroxide and besides the function of the conductive network is apt to deteriorate.

Recently, as a means for improving the incompleteness of the conductive network, JP-A-8-148145 and U.S. Pat. No. 5,629,111 disclose a method which comprises heat treating (oxidizing) cobalt hydroxide in the active material of the positive electrode in the presence of an aqueous alkaline solution and oxygen (air) outside the battery to modify the cobalt hydroxide to a cobalt oxide having a disordered crystal structure and an oxidation number higher than 2. Similarly, JP-A-9-147905 discloses improvement of cobalt oxides having a cobalt valence of 2.5–2.93, and JP-A-9-259888 discloses characteristics of a battery made using β-cobalt oxyhydroxide prepared in the similar manner.

Moreover, the above-mentioned JP-A-8-148145 additionally mentions application of the similar heat treatment to nickel hydroxide solid solution particles having a coating layer of cobalt hydroxide (hereinafter referred to as "Co(OH)$_2$-coated Ni particles"). This process has an advantage that amount of cobalt used can be reduced because of improvement in dispersion of cobalt by previously preparing the Co(OH)$_2$-coated Ni particles. On the other hand, as to the method of preparation in this case, JP-A-9-73900 discloses a method which comprises heating Co(OH)$_2$-coated Ni particles containing an aqueous alkaline solution in a fluidized granulator under fluidization or dispersion. This treatment has the advantage that troubles such as formation of particle lumps due to agglomeration can be diminished.

The main object of the above-mentioned techniques published recently is basically that cobalt oxidation reaction which takes place at the initial charging of batteries is sufficiently performed outside the battery, since the reaction does not satisfactorily proceed under normal conditions. Accordingly, the defect caused by the incompleteness of the conductive network referred to above can be improved.

However, the above-mentioned cobalt oxide cannot be said to be complete in oxidation state and further improvement is required.

BRIEF SUMMARY OF THE INVENTION

The inventors have perceived the above points and conducted detailed experiments and analyses, and, as a result, have found that characteristics of an active material for positive electrodes which comprises γ-cobalt oxyhydroxide having a cobalt valence higher than 3.0 can be further improved as compared with other active materials, but the positive electrode using the above active material shows a greater reduction in capacity upon repetition of charging and discharging cycles at high temperatures than conventional positive electrodes.

The reduction in capacity of batteries upon repetition of charging and discharging cycles at high temperatures is a phenomenon recognized also in conventional positive electrodes. In the case of conventional positive electrodes in which a bivalent cobalt oxide is added to a foamed nickel substrate as a conductive agent and the conductive network is formed by charging (oxidation) in the battery, the bivalent cobalt oxide is dissolved in an electrolyte and re-precipitated (production of cobalt complex ion and re-precipitation as cobalt hydroxide) during the period of from filling the electrolyte to the initial charging. Therefore, the nickel hydroxide solid solution particles are bonded to the foamed nickel substrate through cobalt hydroxide, and when oxidation of cobalt hydroxide takes place by the initial charging and the cobalt hydroxide changes to β-cobalt oxyhydroxide or the like which does not dissolve in the electrolyte, the active material particles (which mean here the sum of the nickel hydroxide solid solution particles and the cobalt oxide conductive agent) are strongly bound to the foamed nickel substrate. However, when the charging and discharging cycles are repeated at high temperatures, the cobalt oxide which forms the conductive network gradually changes in structure to a thermodynamically stable oxide such as $Co_3O_4$ or $CoHO_2$ and results in growth of crystal. The conductivity of the thus produced $Co_3O_4$ or $CoHO_2$ is lower than in the initial state containing β-cobalt oxyhydroxide, and hence the capacity of positive electrode lowers.

On the other hand, when a cobalt oxide which has been oxidized to the state of being higher than 3.0 in cobalt valence outside the battery is used as a conductive agent, cobalt hydroxide in the powdery state before production of a positive electrode is oxidized, and hence there is no strong binding between the active material particles and the foamed nickel substrate in the positive electrode produced using the above cobalt oxide. However, since the conductivity of the cobalt oxide higher than 3.0 in valence is very high at the initial charging and discharging cycle of the battery just after produced, the above problem can be ignored and the positive electrode yields a capacity higher than conventional positive electrodes. On the other hand, if charging and discharging cycles are repeated at high temperatures, the similar structural change of the cobalt oxide also occurs in the above positive electrode. In this case, the lack of the binding between the active material particles and the substrate causes a severe problem.

That is, in the case of a positive electrode using a cobalt oxide which has been oxidized, outside the battery, to the state of being higher than 3.0 in cobalt valence as a conductive agent, when charging and discharging cycles are repeated at high temperatures, reduction in capacity of the positive electrode occurs due to decrease in conductivity of the cobalt oxide per se which forms the conductive network (the same mode of reduction in capacity of conventional positive electrodes) and additionally the incompleteness of current collectivity caused by the lack of the binding between the active material particles and the substrate (the mode of reduction in capacity peculiar in this case). Accordingly, degree of the reduction in capacity is very high as compared with conventional positive electrodes.

The main object of the present invention is to improve characteristics of active materials for positive electrode by using γ-cobalt oxyhydroxide and solve the problem of the reduction in capacity of positive electrode caused by charging and discharging cycle at high temperatures in alkaline storage batteries.

The present invention which solves the above problem relates to a non-sintered positive electrode for alkaline storage batteries, characterized in that spherical nickel hydroxide solid solution particles having an average particle size of 5–20 μm and a cobalt oxide conductive agent having an average particle size of 1 μm or less and mainly composed of γ-cobalt oxyhydroxide having a cobalt valence of higher than 3.0 are held in a foamed nickel substrate having the number of pores of 80–160 pores/inch ($PPI_{2D}$) and a thickness of skeleton of 30–60 μm and the total occupying ratio of the spherical nickel hydroxide solid solution particles and the cobalt oxide conductive agent based on the whole electrode plate is in the range of 75–85 vol %, and further relates to an alkaline storage battery using the said positive electrode.

By employing the above construction, the lack of binding between the active material particles and the foamed nickel substrate which is peculiar to a positive electrode using a cobalt oxide of higher valence is sufficiently compensated by the intimate physical contact between the active material particles and the substrate (securement of current collection), and hence the reduction in capacity of positive electrode caused by charging and discharging cycle at high temperatures can be highly inhibited. That is, there can be provided an alkaline storage battery which is high in energy density and excellent in overdischarge resistance and besides excellent in cycle life characteristics at high temperatures. Other objects of the present invention will become apparent from the following detailed description.

BRIEF DESCRIPTION OF THE SEVERAL VIEWS OF THE DRAWINGS

FIG. 2 shows schematic views illustrating typical shapes of the cross-sectional view of skeletons of the foamed nickel substrate and thickness of the skeletons.

FIG. 4 is a graph which shows relation between the occupying ratio of the active material in the whole electrode plate of each electrode and the capacity density of the positive electrode in Example 1.

DETAILED DESCRIPTION OF THE INVENTION

The first embodiment of the present invention relates to a non-sintered positive electrode for alkaline storage batteries which comprises a foamed nickel substrate having the number of pores of 80–160 pores/inch ($PPI_{2D}$) and a thickness of skeleton of 30–60 μm in which spherical nickel hydroxide solid solution particles having an average particle size of 5–20 μm and a cobalt oxide conductive agent having an average particle size of 1 μm or less and mainly composed of γ-cobalt oxyhydroxide having a cobalt valence of higher than 3.0 are held and the total occupying ratio of the spherical nickel hydroxide solid solution particles and the cobalt oxide conductive agent in the whole electrode plate falls within the range of 75–85 vol %.

The γ-cobalt oxyhydroxide here is an oxide of higher oxidation number having a cobalt valence of higher than 3.0 which is obtained by subjecting cobalt hydroxide to a strong thermal oxidation in the presence of KOH or NaOH, and it is markedly higher in electrical conductivity than conventional β-cobalt oxyhydroxide. Therefore, not only the initial capacity of active materials for positive electrode, but also resistance of positive electrode in overdischarge are improved.

As the foamed nickel substrates, there are used those which have the number of pores of 80–160 pores/inch ($PPI_{2D}$) and a thickness of skeleton of 30–60 μm. The number of pores and thickness of the skeleton of the foamed nickel substrates were measured in the following manner.

Figure 1:
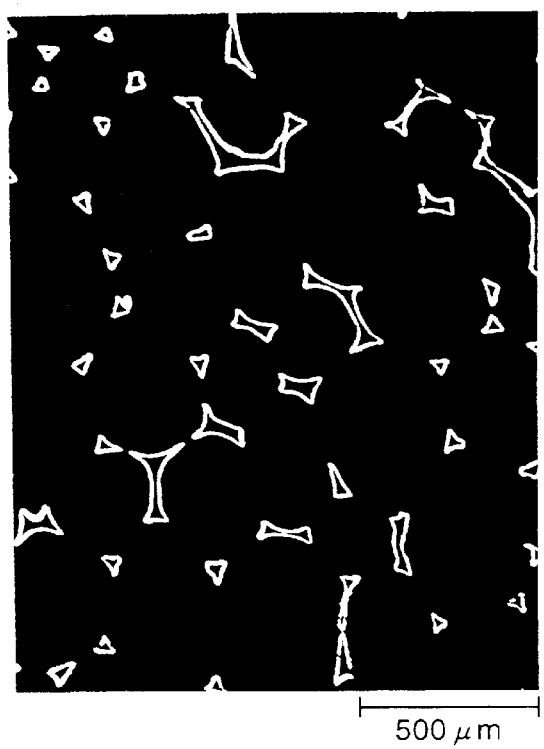
FIG. 1 is a microphotograph (magnification: 50×) showing the cross-sectional view of the foamed nickel substrate A used in the Examples of the present invention.

First, a foamed nickel substrate of 2 cm×2 cm is immersed in a solution of epoxy resin and subjected to a sufficient vacuum defoaming, and thereafter heat cured. Then, this is abraded and a section (in the direction parallel to the plane of the original substrate) of the foamed nickel substrate is obtained on the surface of the resin. The surface of the section is photographed using a metallurgical microscope (magnification: 50×) and a camera to obtain sectional images of the skeleton of the substrate as shown in FIG. 1. The sectional images of the skeleton can be considered to be such that triangles (triple points) each of which corresponds to the section of one substrate skeleton are scattered on a plane in the form of single triple points or a plurality of triple points bonded as schematically shown in FIG. 2. Therefore, the length of one side of the triangle (shown in FIG. 2) corresponds to the thickness of the substrate skeleton. Furthermore, by counting the number of triple points observed in a visual field, the number of pores present per unit length (inch) (pore/inch: $PPI_{2D}$) can be calculated using the following formula 1 which is based on the statistical model. The greater $PPI_{2D}$ value means the smaller size of the pores of the porous substrate. The above method is well known, and the $PPI_{2D}$ value is used very often as an indication showing "size of pores" of foamed urethane substrate and others.

$$PPI_{2D} = \left[ -132 + 3.3744 \chi \frac{G^2}{S} + 6.6 \times 10^{-5} \left( \chi \frac{G^2}{S} \right)^2 \right]^{1/2}$$

(χ: The number of triple points in the visual field, G: Magnification of microscope, S: Area of photograph taken ($cm^2$))

The triple points (namely, the substrate skeletons) observed in FIG. 1 are hollow. This is because the foamed nickel substrate was produced by the method which comprises subjecting a foamed urethane substrate to electrolytic nickel plating and then firing and removing the basic urethane substrate. The portion of the removed urethane skeletons constitutes the hollow. According to this method, the number of pores or thickness of the skeleton of the foamed nickel substrate can be optionally controlled by suitably adjusting the number of pores of the foamed urethane substrate as base or thickness of nickel plating.

The foamed nickel substrate used for the positive electrode of the present invention has the number of pores of 80–160 pores/inch ($PPI_{2D}$), which is larger than that of conventional positive electrodes (60 pore/inch or less). That is, since the size of the pores is small, the degree of physical contact between the skeleton forming the pores and the active material particles held in the pores increases, and ability of current collection from the active material particles can be much enhanced over the conventional positive electrodes. Moreover, thickness of the substrate skeleton is 30–60 μm, which is within the range where substrate strength and porosity are well balanced. Therefore, when in the pores of this substrate is held a mixture of spherical nickel hydroxide solid solution particles having an average particle size of 5–20 μm and a cobalt oxide conductive agent mainly composed of γ-cobalt oxyhydroxide having an average particle size of 1 μm or less and the total occupying ratio of the spherical nickel hydroxide solid solution particles and the cobalt oxide conductive agent based on the whole electrode plate is in the range of 75–85 vol %, the lack of binding between the active material particles and the foamed nickel substrate can be sufficiently compensated by the intimate physical contact (current collection) between the active material particles and the substrate, and hence the reduction in capacity of positive electrode caused by charging and discharging cycle at high temperatures can be inhibited.

According to the inventors' investigation, if the number of pores of the foamed nickel substrate is less than 80 pores/inch, the size of the pores is too large, and intimate physical contact between the substrate skeleton and the active material particles cannot be attained, and if the number of the pores exceeds 160 pores/inch, the size of the pores is too small, and packing operation of the active material particles in the pores at the time of making the positive electrode is difficult. If thickness of the skeleton of the foamed nickel substrate is less than 30 μm, sufficient strength of the substrate cannot be maintained, and if it exceeds 60 μm, the degree of occupation of the skeleton is too large, and hence the amount of active material to be packed cannot be increased and a positive electrode of high energy density cannot be obtained. If the average particle size of the nickel hydroxide solid solution particles is smaller or larger than 5–20 μm, reduction in packing ability of particles and in bulk density is brought about, and thus a positive electrode of high energy density cannot be obtained. If the average particle size of the cobalt oxide conductive agent mainly composed of γ-cobalt oxyhydroxide exceeds 1 μm, dispersibility of the conductive agent decreases and this is also not preferred. Moreover, if the total occupying ratio of the active material particles (the sum of the nickel hydroxide solid solution particles and the cobalt oxide conductive agent) based on the whole electrode plate is less than 75%, packing density is low and intimate physical contact cannot be obtained between the active material particles and the skeleton forming the pores of the substrate. If the ratio exceeds 85%, the liquid-passing space decreases and supply of electrolyte to the active material in the electrode plate (circulation of liquid) becomes insufficient to cause reduction of capacity.

For the above reasons, all the various numerical values are optimally in the above ranges. According to this construction, there can be provided a non-sintered positive electrode for alkaline storage batteries which is high in energy density and excellent in overdischarge resistance and besides excellent in cycle life characteristics at high temperatures.

In the above embodiment, it is preferred that amount of the cobalt oxide conductive agent mainly composed of γ-cobalt oxyhydroxide is 2–10 wt % based on the amount of the nickel hydroxide solid solution particles. If this amount is too small, sufficient current collection from the nickel hydroxide solid solution particles cannot be maintained, and if it is too large, the amount of the nickel hydroxide solid solution particles which determines capacity of positive electrode relatively decreases and the positive electrode cannot have a high energy capacity. Thus, the above range is suitable.

The second embodiment of the present invention relates to a non-sintered positive electrode for alkaline storage batteries which comprises a foamed nickel substrate having the number of pores of 80–160 pores/inch ($PPI_{2D}$) and a thickness of skeleton of 30–60 $\mu$m in which spherical nickel hydroxide solid solution particles having an average particle size of 5–20 $\mu$m and having a coating layer of a cobalt oxide having a cobalt valence of higher than 3.0 (which are hereinafter referred to as "Co-coated nickel hydroxide solid solution particles") are held and the occupying ratio of the Co-coated nickel hydroxide solid solution particles based on the whole electrode plate falls within the range of 75–85 vol %.

In this embodiment, thickness of the coating layer of cobalt oxide having a cobalt valence of higher than 3.0 is preferably 0.2 $\mu$m or less. This is because if the thickness of the Co-coating layer is too great, the amount of the nickel hydroxide solid solution particles which determines capacity of positive electrode relatively decreases and the positive electrode cannot have a high energy capacity.

The third embodiment of the present invention relates to an alkaline storage battery comprising a positive electrode, a negative electrode, a separator and an electrolyte, wherein said positive electrode comprises a foamed nickel substrate having the number of pores of 80–160 pores/inch ($PPI_{2D}$) and a thickness of skeleton of 30–60 $\mu$m in which spherical nickel hydroxide solid solution particles having an average particle size of 5–20 $\mu$m and a cobalt oxide conductive agent having an average particle size of 1 $\mu$m or less and mainly composed of $\gamma$-cobalt oxyhydroxide having a cobalt valence of higher than 3.0 are held and the total occupying ratio of the spherical nickel hydroxide solid solution particles and the cobalt oxide conductive agent based on the whole electrode plate falls within the range of 75–85 vol %.

In this embodiment, amount of the cobalt oxide conductive agent mainly composed of $\gamma$-cobalt oxyhydroxide is optimally 2–10 wt % based on the amount of the spherical nickel hydroxide solid solution particles.

The fourth embodiment of the present invention relates to an alkaline storage battery comprising a positive electrode, a negative electrode, a separator and an electrolyte, wherein said positive electrode comprises a foamed nickel substrate having the number of pores of 80–160 pores/inch ($PPI_{2D}$) and a thickness of skeleton of 30–60 $\mu$m in which spherical nickel hydroxide solid solution particles having an average particle size of 5–20 $\mu$m and having a coating layer of a cobalt oxide having a cobalt valence of higher than 3.0 are held and the occupying ratio of the Co-coated spherical nickel hydroxide solid solution particles based on the whole electrode plate falls within the range of 75–85 vol %.

In this embodiment, thickness of the coating layer of cobalt oxide having a cobalt valence of higher than 3.0 is preferably 0.2 $\mu$m or less, which exhibits the maximum effect of the Co-coating layer.

EXAMPLE

Examples of the present invention will be explained in detail below, without limiting the invention to the specific details of these examples.

Production of Foamed Nickel Porous Substrate

A foamed nickel substrate which holds active material for positive electrode was produced by the following known method. First, a foamed urethane substrate was coated with carbon to impart electrical conductivity thereto, and then subjected to electrical nickel plating in a nickel bath. After the plating, the urethane substrate as base was removed by firing it at 600° C., and then subjected to nickel reduction treatment in a hydrogen stream at 900° C. The resulting porous body was pressed by roll to a uniform thickness of 1.3 mm to obtain a foamed nickel substrate.

According to this method, the number of pores and thickness of skeleton of the resulting foamed nickel substrate can be controlled by adjusting the number of pores of the foamed urethane substrate as the base and the conditions of the nickel plating.

In this example, there were prepared a foamed nickel substrate A produced by using a foamed urethane substrate having the number of pores greater than that of conventional substrates and adjusting the nickel plating conditions so as to obtain thin nickel plating layer and a foamed nickel substrate B usually employed for conventional positive electrodes for comparison. Both the foamed nickel substrate had a basis weight (weight per unit area) of about 500 g/m$^2$.

Thickness of skeleton and the number of pores of these two foamed nickel substrates were determined by the following methods. First, the foamed nickel substrate A was cut to 2 cm×2 cm and immersed in a solution of epoxy resin, followed by subjecting it to sufficient vacuum defoaming and then heat curing. Then, this was abraded to obtain a section (in the direction parallel to the plane of the original substrate) of the foamed nickel substrate on the surface of the resin.

This surface was photographed using a metallurgical microscope (magnification: 50×) and a camera to obtain sectional images of the substrate skeleton as shown in FIG. 1. This sectional image of the skeleton can be considered to be such that triple points each of which corresponds to the section of one substrate skeleton of the foamed nickel substrate A are scattered on the plane in the form of a single triple point or a bonded triple point as schematically shown in FIG. 2.

In this case, since the length of one side of the triple point (shown in FIG. 2) corresponds to the thickness of the substrate skeleton, this can be measured from FIG. 1. Average value of the thickness of skeleton of the foamed nickel substrate A was calculated from FIG. 1 and ten photographs taken in other visual fields to obtain 42 $\mu$m. The triple points (namely, the substrate skeletons) in FIG. 1 are hollow. This is because this foamed nickel substrate was produced by the method which comprises subjecting the urethane substrate to electrolytic nickel plating and then removing the urethane substrate as base by firing it (the portion of the removed urethane skeleton became hollow) as mentioned above. Furthermore, by counting the number of triple points observed in the visual field of FIG. 1, the number of pores present per unit length (inch) (pore/inch: $PPI_{2D}$) can be calculated using the formula 1. The greater $PPI_{2D}$ value means the smaller size of the pores of the porous substrate.

The above formula was applied to FIG. 1 and the ten photographs taken in other visual fields and the average value of $PPI_{2D}$ (the average value on the eleven photographs) of the foamed nickel substrate A to obtain 88 pores/inch.

Figure 3:
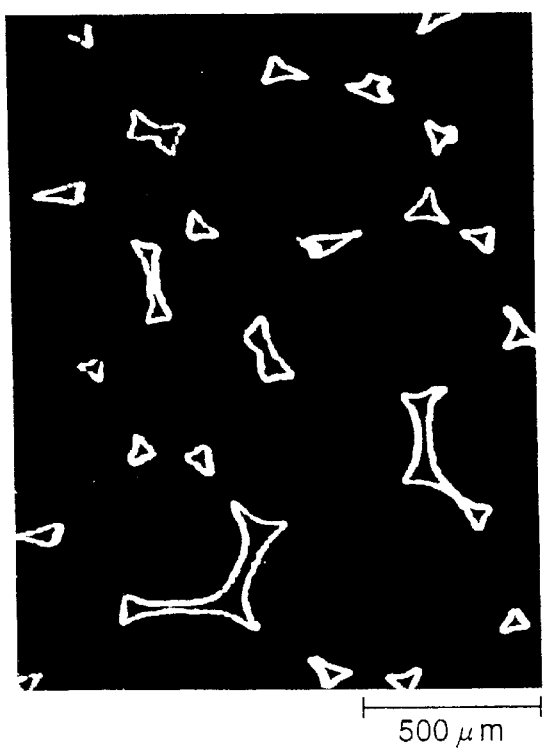
FIG. 3 is a microphotograph (50×magnification) showing the cross-sectional view of the comparative foamed nickel substrate B.

The same measurement was conducted on the comparative foamed nickel substrate B. The image of the section of the resulting substrate skeleton is shown in FIG. 3. In the same manner as above, when the data from FIG. 3 were combined with the data from ten photographs taken in other visual fields, the average value of the thickness of the substrate skeletons obtained was 73 µm and the average value of $PPI_{2D}$ was 59 pores/inch.

Example 1

Production of Positive Electrode

An aqueous cobalt sulfate solution of 1 mol/l was gradually added to an aqueous sodium hydroxide solution, and the mixture was stirred with adjusting so as to keep a pH of 12 of the aqueous solution at 35° C. to precipitate cobalt hydroxide. This was washed with water and then vacuum dried, and the resulting product was employed as a cobalt hydroxide standard sample. It was confirmed by an electron microscope that the sample was in the form of hexagonal plate-like particles of about 0.2 µm in size.

Then, potassium hydroxide reagent (special grade, granules) was pulverized in a dry atmosphere (in a dry box), and this was mixed in a sufficient amount with the cobalt hydroxide standard sample, and the mixed sample was taken out of the dry box and put in a heating container of 110° C., into which air was fed. During this process, the mixed sample was in the state containing a small amount of water in the air due to deliquescence of potassium hydroxide, and oxidation proceeded accordingly. The sample was kept in the heating container for 12 hours and the oxidation reaction was completed. Then, the sample was taken out and thoroughly washed with water, followed by drying at 80° C. over a period of 3 hours to obtain γ-cobalt oxyhydroxide having a cobalt valence of higher than 3.0 (hereinafter referred to as "X1").

Nickel hydroxide solid solution particles which were matrix particles for positive electrode were prepared by the following known method. That is, an aqueous sodium hydroxide solution with adjusting pH of the solution with aqueous ammonia was gradually added to an aqueous solution mainly composed of nickel sulfate and containing a given amount of cobalt sulfate and zinc sulfate to precipitate spherical nickel hydroxide solid solution particles. The precipitated nickel hydroxide solid solution particles were washed with water and dried to obtain matrix particles for positive electrode. The nickel hydroxide solid solution particles had a tap density of about 2.0 g/cc and an average particle size of 10 µm.

Then, to 100 parts by weight of the resulting nickel hydroxide solid solution particles were added 7.0 parts by weight of the X1, 0.2 part by weight of polytetrafluoroethylene (PTFE) as a binder, and a suitable amount of pure water, and they were mixed and dispersed to prepare an active material slurry. This active material slurry was filled in the foamed nickel substrate A and dried in a dryer of 80° C., and then this was rolled to about 0.7 mm by a roll press. In this case, amount of the active material slurry filled, pressing force of the roll press, number of pressing and others were properly adjusted so that the total occupying ratio of the active material (the sum of the nickel hydroxide solid solution particles and the X1) to the whole electrode plate fell within 70 vol %. This was cut to a given size to obtain a nickel positive electrode. This positive electrode was called "A-X1-70" (which means "kind of foamed nickel substrate—kind of cobalt oxide conductive agent—active material occupying ratio in substrate").

In the same manner as above, positive electrodes: A-X1-75, A-X1-80, A-X1-85 and A-X1-90 of 75 vol %, 80 vol %, 85 vol % and 90 vol % in total occupying ratio of active material in the whole electrode plate were produced by suitably changing the amount of the active material filled, the pressing force of roll press and the number of pressing in roll pressing.

Furthermore, five positive electrodes: B-X1-70, B-X1-75, B-X1-80, B-X1-85 and B-X1-90 were produced in the same manner as above, except that the foamed nickel substrate B was used in place of the foamed nickel substrate A.

Moreover, ten positive electrodes: A-Y1-70, A-Y1-75, A-Y1-80, A-Y1-85, A-Y1-90, B-Y1-70, B-Y1-75, B-Y1-80, B-Y1-85 and B-Y1-90 were produced in the same manner as above, except that 7.0 parts by weight of the cobalt hydroxide standard sample (hereinafter referred to as "Y1") was used as the cobalt oxide conductive agent added to the positive electrode in place of γ-cobalt oxyhydroxide.

Fabrication of Battery and Evaluation of Capacity Density of Positive Electrode

Nickel-metal hydride storage batteries of 800 mAh in nominal capacity and of 4/3AAA (L-AAA) in size were fabricated by known method using each of the above twenty nickel positive electrodes, a negative electrode mainly composed of a hydrogen-storing alloy power, a polypropylene nonwoven fabric separator subjected to hydrophilic treatment and an electrolyte mainly composed of 7–8 N potassium hydroxide.

These batteries were subjected to repeatedly five cycles, one cycle of which comprised charging at a charging rate of 0.1 CmA for 15 hours and discharging at a discharging rate of 0.2 CmA until the battery voltage reached 1.0 V, and the discharge capacity at the fifth cycle was measured. The capacity obtained was divided by the volume of the whole positive electrode plate to obtain capacity density (discharge capacity per unit volume) of the respective positive electrodes. FIG. 4 shows the relation between the total occupying ratio (vol %) of the active material for the whole electrode plate taken on the abscissa axis in the graph and the capacity density of the positive electrode taken on the ordinate axis in the graph. The capacity density of the positive electrode was standardized by assuming the value of A-X1-80 having the highest value to be 100. From FIG. 4, the following can be seen.

Irrespective of the kind of the foamed nickel substrate, the positive electrodes containing X1 (γ-cobalt oxyhydroxide) as a conductive agent are higher in capacity density than those containing Y1 (the cobalt hydroxide standard sample). This is because X1 has a very high conductivity since the cobalt valence is higher than 3.0. The effect of the kind of the foamed nickel substrate (A or B) on the capacity density is not so great in FIG. 4. On the other hand, when the total occupying ratio of the active material for the whole electrode plate is 90 vol %, the capacity density of the positive electrode decreases much in all of the four groups of the positive electrodes (A-X1, B-X1, A-Y1 and B-Y1). It is presumed that this is because the ratio of the volume of active material in the whole electrode plate is too high and the liquid-passing space in the electrode plate decreases to cause insufficient supply of electrolyte (circulation of electrolyte) to the active material in the electrode plate. Thus, it is necessary that the ratio is up to about 85 vol %.

Though not mentioned in detail here, it was confirmed by another evaluation that irrespective of the kind of the foamed nickel substrate, the positive electrodes containing X1 as a conductive agent were superior in overdischarge resistance to the positive electrodes containing Y1. The reason is basically also due to the very high conductivity of X1.

High-temperature Cycle Life Test

Figure 5:
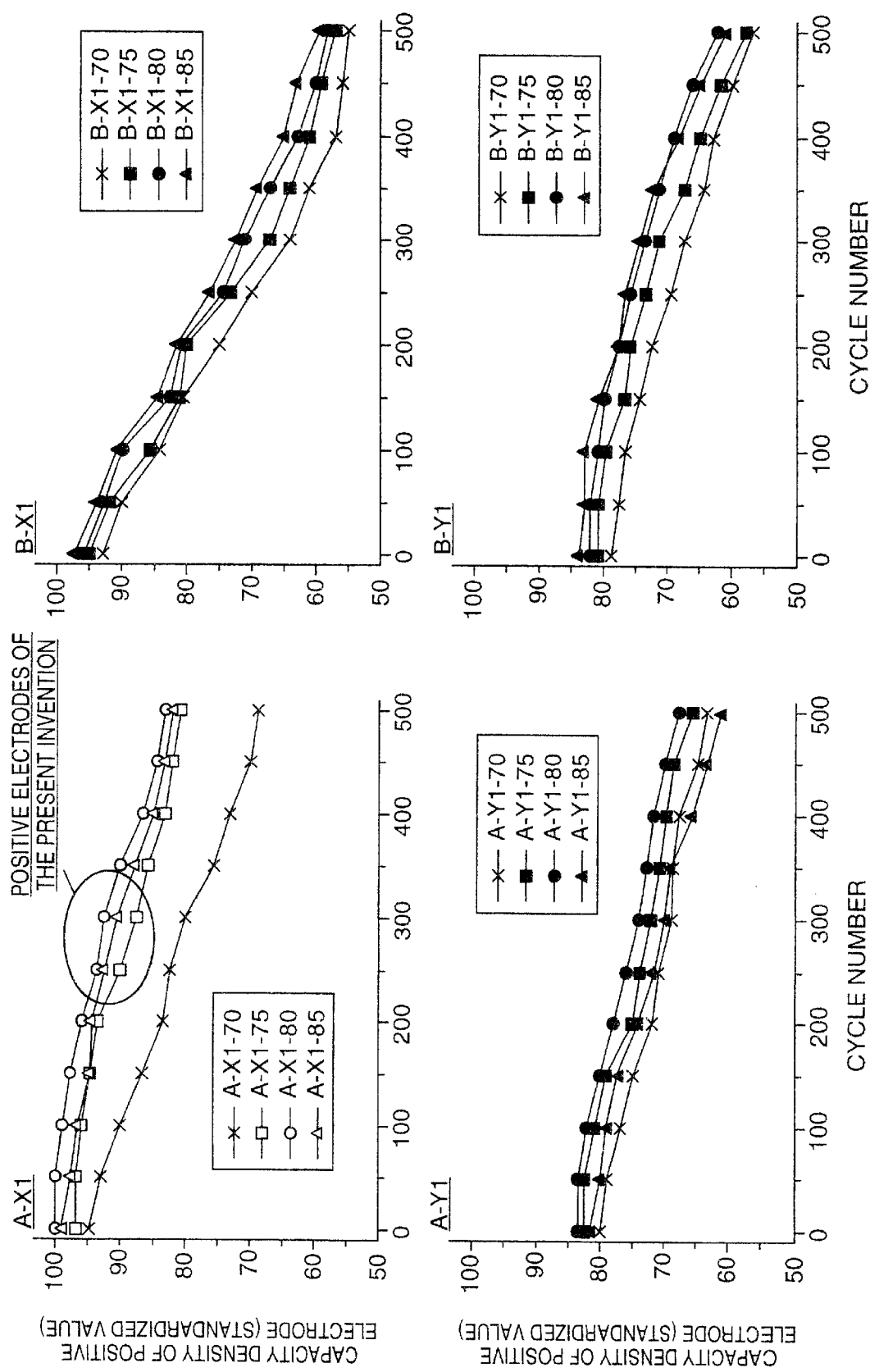
FIG. 5 is a graph which shows relation between the number of charging and discharging cycle of each positive electrode at high temperatures and the capacity density of the positive electrode in Example 1.

Sixteen batteries using positive electrodes of the four groups of A-X1, B-X1, A-Y1 and B-Y1 in which the ratio of the volume of active material in the whole electrode plate was 70, 75, 80 or 85 vol % were subjected to a test of 500 cycles, one cycle of which comprised charging at 40° C. and a charging rate of 1 CmA with -ΔV control (cut-off voltage of 5 mV) and discharging at 40° C. and a discharging rate of 1 CmA with cut voltage of 0.8 V, thereby to measure the change of battery capacity (discharge capacity until 1.0 V). With respect to the results of the test, FIG. 5 shows the relation between the number of charging and discharging cycles taken on the abscissa axis in the graph and the capacity density of the positive electrode taken on the ordinate axis in the graph. The capacity density of the positive electrode was standardized assuming the value of the first cycle of A-X1-80 having the highest value to be 100. From FIG. 5, the following can be seen.

First, the positive electrodes of groups A-Y1 and B-Y1 using Y1 as a conductive agent shows nearly the same cycle behavior irrespective of the kind of the foamed nickel substrate (A or B). In these positive electrodes, conductivity of the cobalt oxide per se containing β-cobalt oxyhydroxide which forms a conductive network is not so high, and therefore initial capacity density of the positive electrodes is also not so high. However, irrespective of the kind of the foamed nickel substrate, the active material particles are strongly bound to the foamed nickel substrate by dissolution/re-precipitation reaction of cobalt hydroxide at the time of formation of the conductive network, and hence decrease of capacity due to the charging and discharging cycle is small. The reason for the capacity gently decreasing with the cycles is that the cobalt oxide forming the conductive network structurally changed to thermodynamically stable oxides such as $Co_3O_4$ and $CoHO_2$. Since conductivity of the resulting $Co_3O_4$ and $CoHO_2$ is lower than the initial oxide containing β-cobalt oxyhydroxide, the capacity of positive electrodes gradually decreases.

On the other hand, in the case of the positive electrodes of the groups A-X1 and B-X1 using X1 as a conductive agent, the cycle behavior shows great difference depending on the kind of the foamed nickel substrate (A or B). The positive electrodes of the group B-X1 using the foamed nickel substrate B less in the number of pores which is conventionally widely used shows considerably great decrease of capacity. The reason is considered to be as follows.

When X1 (γ-cobalt oxyhydroxide) is used as a conductive agent, since oxidation of cobalt hydroxide is carried out in the state of powder before making positive electrode, there is present no strong binding between the active material particles and the foamed nickel substrate in the resulting positive electrode. This causes no problem in the initial charging and discharging cycles after fabrication of batteries because conductivity of X1 is very high, and the positive electrodes of the group B-X1 give a capacity density higher than that of the positive electrodes of groups A-Y1 and B-Y1. However, even the positive electrodes of the group B-X1 undergo structural change of the cobalt oxide if the charging and discharging cycles are repeated at high temperatures. In this case, decrease in capacity of positive electrode occurs due to the incompleteness of current collection (mode of decrease of capacity peculiar to X1) caused by the lack of the binding between the active material particles and the substrate in combination with the reduction of conductivity of the cobalt oxide per se which forms conductive network (the same mode of decrease of capacity as in the case of using Y1). For this reason, the capacity decreases greatly as compared with the positive electrodes of the groups A-Y1 and B-Y1.

On the other hand, the positive electrodes of the group A-X1 using the foamed nickel substrate A which are great in the number of pores are less in decrease of capacity, and the three positive electrodes: A-X1-75, A-X1-80 and A-X1-85 of the present invention in which the ratio of volume of the active material in the whole electrode plate is set at 75–85 vol % are particularly excellent. Taking into account the above-mentioned mechanism of decrease of capacity in using X1, this can be understood as follows.

That is, in the foamed nickel substrate A small in the size of pores, the degree of physical contact between the skeleton forming the pores and the active material particles held in the pores increases and thus the current collecting ability from the active material particles can be markedly enhanced than conventional ones. Therefore, it is considered that in the positive electrodes of the group A-X1 holding the active material particles in small pores, the lack of binding between the active material particles and the foamed nickel porous substrate is sufficiently compensated by ensuring the intimate physical contact (current collection) between them. Accordingly, the mode of decrease of capacity peculiar to X1 is avoided, and decrease in capacity of the positive electrode caused by the charging and discharging cycles at high temperatures is inhibited. The reason for the decrease of capacity of the positive electrode A-X1-70 being somewhat greater than that of others is presumed that since the packing density of the active material in this positive electrode is low, the intimate physical contact between the active material particles and the substrate is incomplete. From this point, it can be said that the total occupying ratio of the positive electrode particles in the whole electrode plate is optimally in the range of 75–85 vol %.

Example 2

Production of Positive Electrode

The same spherical nickel hydroxide solid solution particles as used in Example 1 were introduced into an aqueous cobalt sulfate solution and an aqueous sodium hydroxide solution was gradually added thereto, and stirring was continued with adjusting to keep a pH of 12 at 35° C. to precipitate cobalt hydroxide on the surface of the solid solution particles, thereby obtaining $Co(OH)_2$-coated Ni particles. Here, as for the coating amount of cobalt hydroxide, adjustment was conducted so as to give 5.0% by weight in weight ratio of the coating layer to the total weight of the $Co(OH)_2$-coated Ni particles. The resulting $Co(OH)_2$-coated particles were washed with water and then vacuum dried. It was confirmed by an electron microscope that the cobalt hydroxide of the coating layer of about 0.1 μm thick covered the whole surface of the particles.

Subsequently, the $Co(OH)_2$-coated Ni particles were impregnated with a suitable amount of a 45 wt % aqueous potassium hydroxide solution. Then, the particles were heated in a drying apparatus provided with a function of microwave heating with feeding oxygen thereinto to completely dry them. By this operation, the cobalt hydroxide coating layer on the surface of the particles was oxidized to the state of higher order exceeding 3.0 in valence and turned to deep blue. The particles were sufficiently washed with water and dried to make Co-oxydized active material particles (hereinafter referred to as "X2").

Then, 0.2 part by weight of polytetrafluoroethylene (PTFE) as a binder and a suitable amount of pure water were added to 100 parts by weight of the resulting X2, and they were mixed and dispersed to prepare an active material slurry. This active material slurry was filled in the foamed nickel substrate A and dried in a dryer of 80° C., and then this was rolled to about 0.7 mm by a roll press. In this case, amount of the active material slurry filled, pressing force of the roll press, number of pressing and others were properly adjusted so that the total occupying ratio of the active material in the whole electrode plate was 70 vol %. This was cut to a given size to obtain a nickel positive electrode. This positive electrode was called "A-X2-70" as in Example 1.

In the same manner as above, positive electrodes: A-X2-75, A-X2-80, A-X2-85 and A-X2-90 of 75 vol %, 80 vol %, 85 vol % and 90 vol % in total occupying ratio of active material in the whole electrode plate were produced by suitably changing the amount of the active material filled, the pressing force of roll press and the number of pressing in roll pressing.

Furthermore, five positive electrodes: B-X2-70, B-X2-75, B-X2-80, B-X2-85 and B-X2-90 were produced in the same manner as above, except that the foamed nickel substrate B was used in place of the foamed nickel substrate A.

Moreover, ten positive electrodes: A-Y2-70, A-Y2-75, A-Y2-80, A-Y2-85, A-Y2-90, B-Y2-70, B-Y2-75, B-Y2-80, B-Y2-85 and B-Y2-90 were produced in the same manner as above, except that unoxidized $Co(OH)_2$-coated Ni particles (hereinafter referred to as "Y2") was used as the active material for positive electrodes.

Fabrication of Battery and Evaluation of Capacity Density of Positive Electrode

Nickel-metal hydride storage batteries of 800 mAh in nominal capacity and of 4/3AAA (L-AAA) in size were fabricated by known method using each of the above twenty nickel positive electrodes, a negative electrode mainly composed of a hydrogen-storing alloy, a polypropylene non-woven fabric separator subjected to hydrophilic treatment and an electrolyte mainly composed of 7–8 N potassium hydroxide.

Figure 6:
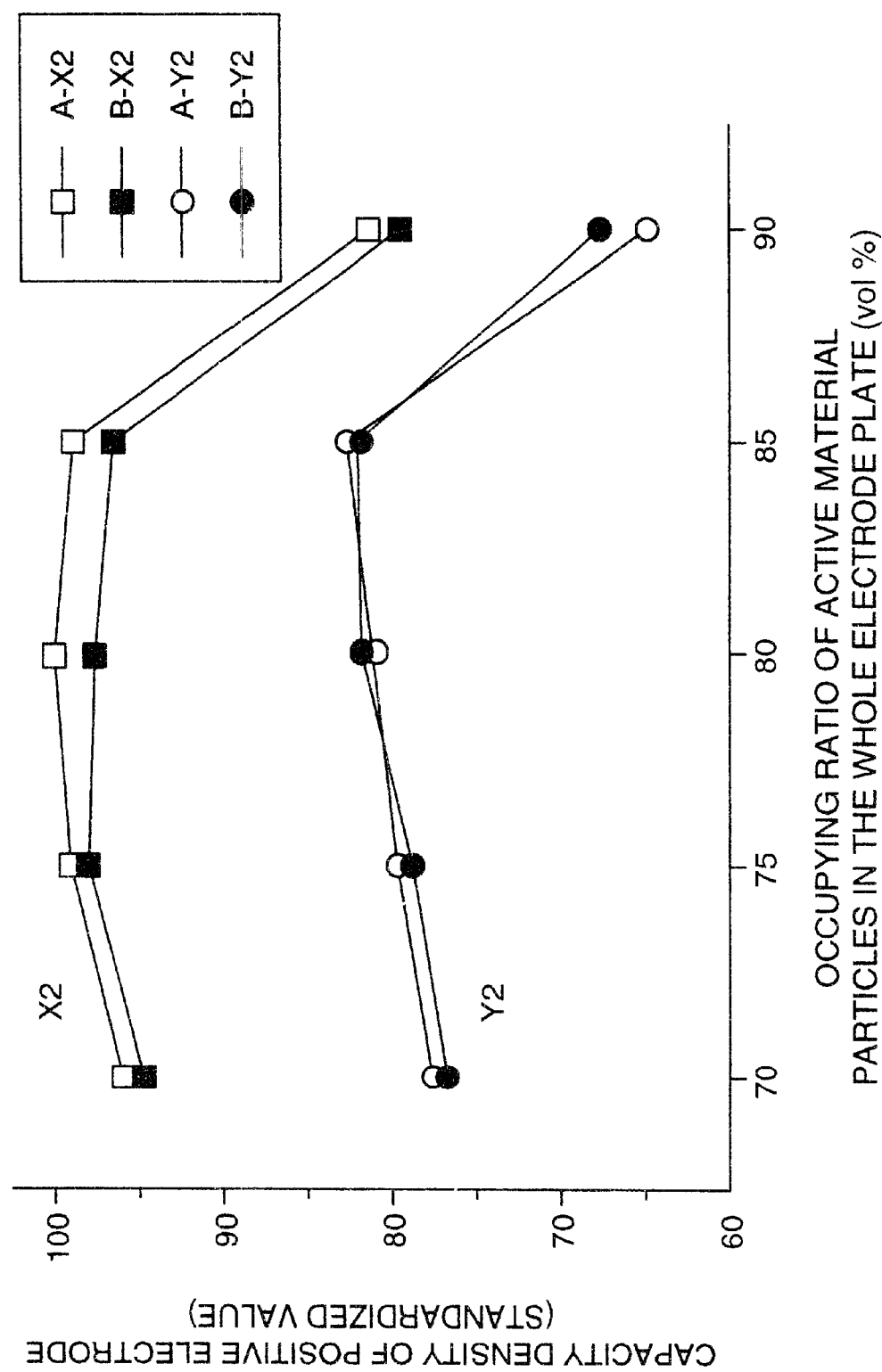
FIG. 6 is a graph which shows relation between the occupying ratio of the active material in the whole electrode plate of each electrode and the capacity density of the positive electrode in Example 2.

These batteries were subjected to a test of repeatedly five cycles, one cycle of which comprised charging at a charging rate of 0.1 CmA for 15 hours and discharging at a discharging rate of 0.2 CmA until the battery voltage reached 1.0 V, and the capacity at the fifth cycle was measured. The capacity obtained was divided by the volume of the whole positive electrode plate to obtain capacity density of the respective positive electrodes. The relation between the total occupying ratio (vol %) of the active material in the whole electrode plate and the capacity density of the positive electrode (standardized assuming the value of A-X2-80 having the highest value to be 100) was shown in a graph with taking the former on the abscissa axis and the latter on the ordinate axis. This graph is FIG. 6. FIG. 6 shows utterly the same tendency as in FIG. 4 obtained in Example 1, and the following can be said.

Irrespective of the kind of the foamed nickel substrate, the positive electrodes using the active material particles X2 are higher in capacity density than those coating with Y2. This is because the cobalt oxide forming the coating layer of X2 has a very high conductivity since the cobalt valence reaches higher than 3.0. The effect of the kind of the foamed nickel substrate (A or B) on the capacity density is hardly recognized in FIG. 6. On the other hand, when the total occupying ratio of the active material in the whole electrode plate is 90 vol %, the capacity density of the positive electrode decreases greatly in all of the four groups of the positive electrodes (A-X2, B-X2, A-Y2 and B-Y2). It is presumed that this is because the ratio of the volume of the active material occupying in the whole electrode plate is too high and the liquid-passing space in the electrode plate decreases to cause insufficient supply of electrolyte (circulation of electrolyte) to the active material in the electrode plate.

High-temperature Cycle Life Test

Figure 7:
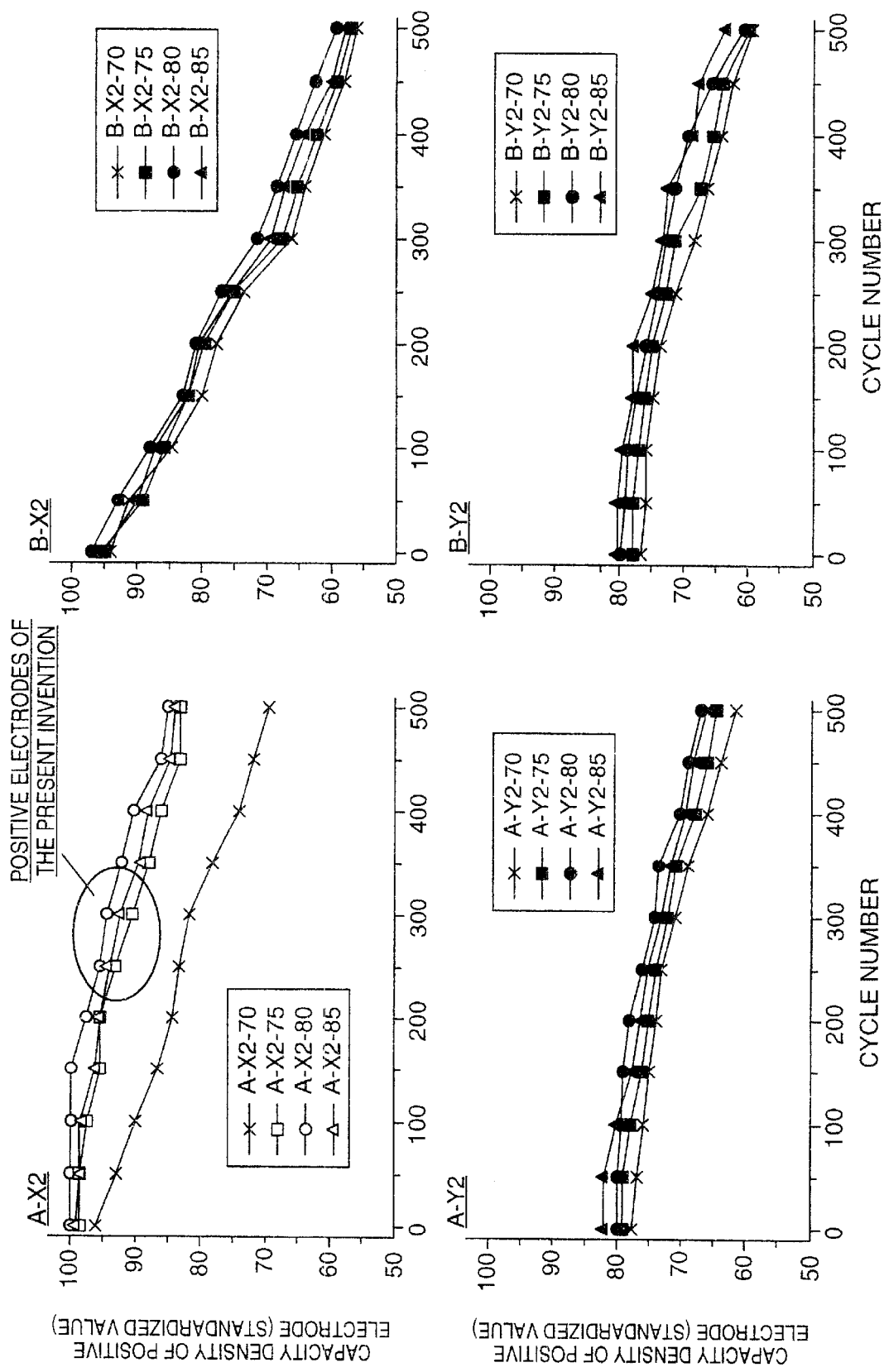
FIG. 7 is a graph which shows relation between the number of charging and discharging cycle of each positive electrode at high temperatures and the capacity density of the positive electrode in Example 2.

Sixteen batteries using positive electrodes of the four groups of A-X2, B-X2, A-Y2 and B-Y2 in which the ratio of the volume of active material occupying in the whole electrode plate was 70, 75, 80 or 85 vol % were subjected to a test of 500 cycles, one cycle of which comprised charging at 40° C. and a charging rate of 1 CmA with $-\Delta V$ control (cut-off voltage of 5 mV) and discharging at 40° C., a discharging rate of 1 CmA and a cut voltage of 0.8 V, thereby to measure the change of battery capacity (discharge capacity until 1.0 V). With respect to the results of the test, the relation between the number of charging and discharging cycles and the capacity density of the positive electrode (standardized assuming the value of the first cycle of A-X2-80 having the highest value to be 100) was shown in a graph with taking the former on the abscissa axis and the latter on the ordinate axis. This graph is FIG. 7. FIG. 7 also shows utterly the same tendency as in FIG. 5 prepared in Example 1, and the following can be seen.

First, the positive electrodes of groups A-Y2 and B-Y2 using the active material particles Y2 show nearly the same cycle behavior irrespective of the kind of the foamed nickel substrate (A or B). In these positive electrodes, conductivity of the cobalt oxide per se (an oxide containing β-cobalt oxyhydroxide) which forms a conductive network is not so high, and, therefore, initial capacity density of the positive electrodes is also not so high. However, irrespective of the kind of the foamed nickel substrate, the active material particles are strongly bound to the foamed nickel substrate by dissolution/re-precipitation reaction of cobalt hydroxide at the time of formation of the conductive network, and hence decrease of capacity due to the charging and discharging cycle is small. The reason for the capacity gently decreasing with the cycles is that the cobalt oxide forming the conductive network structurally changes to thermodynamically stable oxides such as $Co_3O_4$ and $CoHO_2$ which are low in conductivity.

On the other hand, in the case of the positive electrodes of the groups A-X2 and B-X2 using the active material particles X2, the cycle behavior shows a great difference depending on the kind of the foamed nickel substrate (A or B). The positive electrodes of the group B-X2 using the foamed nickel substrate B less in the number of pores shows considerably great decrease in capacity. As in Example 1, the reason is considered as follows.

When the active material particles X2 are used, since oxidation of cobalt hydroxide is carried out in the state of powder before making positive electrode, there is present no strong binding between the active material particles and the foamed nickel substrate in the resulting positive electrode. This causes no problem in the initial charging and discharging cycles after fabrication of batteries because conductivity of the cobalt oxide forming the coating layer of X2 is very high, and the positive electrodes of the group B-X2 give a capacity density higher than that of the positive electrodes of groups A-Y2 and B-Y2. However, even the positive electrodes of the group B-X2 show structural change of the cobalt oxide if the charging and discharging cycles are repeated at high temperatures. In this case, decrease in capacity of positive electrode occurs due to the incompleteness of current collection (mode of decrease in capacity peculiar to X2) caused by the lack of the binding between the active material particles and the substrate in combination with the reduction of conductivity of the cobalt oxide per se which forms conductive network (the same mode of decrease of capacity as in the case of using Y2). For this reason, the capacity decreases greatly as compared with the positive electrodes of the groups A-Y2 and B-Y2.

On the other hand, the positive electrodes of the group A-X2 using the foamed nickel substrate A great in the number of pores are less in the degree of decrease of capacity, and the three positive electrodes in which the ratio of volume of the active material in the whole electrode plate is set at 75–85 vol % (the positive electrodes of the present invention) are particularly excellent. In the foamed nickel substrate A small in the size of pores, the degree of physical contact between the skeleton forming the pores and the active material particles held in the pores increases and thus the current collecting ability from the active material particles can be markedly enhanced than conventional ones. Therefore, it is considered that in the positive electrodes of the group A-X2 holding the active material particles in these pores, the lack of binding between the active material particles and the foamed nickel porous substrate is sufficiently compensated by ensuring the intimate physical contact (current collection) between them. The reason for the decrease of capacity of the positive electrode A-X2-70 being somewhat greater than that of other positive electrodes is presumed that since the packing density is low, the intimate physical contact between the active material particles and the substrate is incomplete. From this point, it can be said that the total occupying ratio of the active material particles in the whole electrode plate is optimally in the range of 75–85 vol %.

In this Example, the foamed nickel substrate was produced by the method which comprises subjecting a foamed urethane substrate to electrolytic nickel plating and thereafter removing the urethane substrate as base by firing it. However, the method is not limited. The inventors have confirmed that the same effects as above can be obtained using foamed nickel substrates which have the same level as the above A in the number of pores and thickness of skeleton, but which are produced by other method.

Furthermore, in this Example, the Co(OH)$_2$-coated Ni particles were prepared by forming the coating layer utilizing a chemical reaction in the aqueous solution, but the coating condition and others are not limited to those described in this Example. The positive electrodes of the present invention can also be produced by preparing the Co(OH)$_2$-coated Ni particles using other methods, for example, a method which comprises mixing nickel hydroxide solid solution particles with a cobalt hydroxide powder and coating the surface of the particles with cobalt hydroxide utilizing shearing force or impact force generated at the time of the mechanical mixing (mechanical mixing method). The oxidation of the Co(OH)$_2$-coated Ni particles was carried out in the presence of an aqueous potassium hydroxide solution of high concentration, but the same effects can be obtained using an aqueous sodium hydroxide solution of high concentration. For oxidizing the alkali-wetted Co(OH)$_2$-coated Ni particles, a method of heating them in a dryer having a microwave heating function with feeding oxygen into the dryer was employed, but the method is not limited thereto.

As mentioned above, by using the positive electrodes of the present invention, it is possible to provide alkaline storage batteries high in energy density and excellent in overdischarge resistance and others, and, besides, in cycle life characteristics at high temperatures. Thus, the present invention is of very high industrial value.

What is claimed is:

1. A non-sintered positive electrode for alkaline storage batteries which comprises a foamed nickel substrate having the number of pores of 80–160 pores/inch (PPI$_{2D}$) and a thickness of skeleton of 30–60 μm in which spherical nickel hydroxide solid solution particles having an average particle size of 5–20 μm and a cobalt oxide conductive agent having an average particle size of 1 μm or less and mainly composed of γ-cobalt oxyhydroxide having a cobalt valence of higher than 3.0 are held and the total occupying ratio of the spherical nickel hydroxide solid solution particles and the cobalt oxide conductive agent based on the whole electrode plate falls within the range of 75–85 vol %.

2. A non-sintered positive electrode for alkaline storage batteries according to claim 1, wherein the amount of the cobalt oxide conductive agent is 2–10 wt % based on the amount of the spherical nickel hydroxide solid solution particles.

3. A non-sintered positive electrode for alkaline storage batteries which comprises a foamed nickel substrate having the number of pores of 80–160 pores/inch (PPI$_{2D}$) and a thickness of skeleton of 30–60 μm in which spherical nickel hydroxide solid solution particles having an average particle size of 5–20 μm and having a coating layer of a cobalt oxide having a cobalt valence of higher than 3.0 are held and the occupying ratio of the spherical nickel hydroxide solid solution particles coated with cobalt based on the whole electrode plate falls within the range of 75–85 vol %.

4. A non-sintered positive electrode for alkaline storage batteries according to claim 3, wherein the thickness of the cobalt oxide coating layer is 0.2 μm or less.

5. An alkaline storage battery comprising a positive electrode, a negative electrode, a separator and an electrolyte, said positive electrode comprising a foamed nickel substrate having the number of pores of 80–160 pores/inch (PPI$_{2D}$) and a thickness of skeleton of 30–60 μm in which spherical nickel hydroxide solid solution particles having an average particle size of 5–20 μm and a cobalt oxide conductive agent having an average particle size of 1 μm or less and mainly composed of γ-cobalt oxyhydroxide having a cobalt valence of higher than 3.0 are held and the total occupying ratio of the spherical nickel hydroxide solid solution particles and the cobalt oxide conductive agent based on the whole electrode plate falls within the range of 75–85 vol %.

6. An alkaline storage battery according to claim 5, wherein the amount of the cobalt oxide conductive agent is 2–10 wt % based on the amount of the spherical nickel hydroxide solid solution particles.

7. An alkaline storage battery comprising a positive electrode, a negative electrode, a separator and an electrolyte, wherein said positive electrode comprises a foamed nickel substrate having the number of pores of 80–160 pores/inch (PPI$_{2D}$) and a thickness of skeleton of 30–60 μm in which spherical nickel hydroxide solid solution particles having an average particle size of 5–20 μm and having a coating layer of a cobalt oxide having a cobalt valence of higher than 3.0 are held and the occupying ratio of the spherical nickel hydroxide solid solution particles coated with cobalt based on the whole electrode plate falls within the range of 75–85 vol %.

8. An alkaline storage battery according to claim 7, wherein the thickness of the cobalt coating layer is 0.2 μm or less.

* * * * *